(12) United States Patent
Maeyama et al.

(10) Patent No.: US 12,504,854 B2
(45) Date of Patent: Dec. 23, 2025

(54) PEN STATE DETECTION CIRCUIT, METHOD, AND DEVICE, AND PARAMETER SUPPLY DEVICE

(71) Applicant: Wacom Co., Ltd., Saitama (JP)

(72) Inventors: Koichi Maeyama, Saitama (JP); Hideyuki Hara, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 18/882,538

(22) Filed: Sep. 11, 2024

(65) Prior Publication Data
US 2025/0004600 A1 Jan. 2, 2025

Related U.S. Application Data

(63) Continuation of application No. 17/876,963, filed on Jul. 29, 2022, now Pat. No. 12,118,168, which is a continuation of application No. PCT/JP2020/009227, filed on Mar. 4, 2020.

(51) Int. Cl.
*G06F 3/03* (2006.01)
*G06F 3/041* (2006.01)
*G06F 3/044* (2006.01)

(52) U.S. Cl.
CPC .......... *G06F 3/0442* (2019.05); *G06F 3/0416* (2013.01); *G06F 3/0441* (2019.05)

(58) Field of Classification Search
CPC ............. G06F 3/041; G06F 3/03; G06F 3/044
See application file for complete search history.

(56) References Cited

U.S. PATENT DOCUMENTS

| | | | | |
|---|---|---|---|---|
| 10,198,133 | B2* | 2/2019 | Wang | G06F 3/0445 |
| 12,026,326 | B2* | 7/2024 | Maeyama | G06F 3/03545 |
| 12,118,168 | B2* | 10/2024 | Maeyama | G06F 3/0446 |
| 12,314,516 | B2* | 5/2025 | Nomura | G06F 3/03545 |
| 2004/0001112 | A1 | 1/2004 | Kurtenbach et al. | |
| 2007/0118305 | A1* | 5/2007 | Sullivan | G06F 3/043 702/56 |

(Continued)

FOREIGN PATENT DOCUMENTS

WO   WO 2019013222 A1   1/2019

OTHER PUBLICATIONS

International Search Report, dated May 26, 2020, for International Application No. PCT/JP2020/009227. (3 pages).

*Primary Examiner* — Olga V Merkoulova
(74) *Attorney, Agent, or Firm* — Seed Intellectual Property Law Group LLP

(57) ABSTRACT

A pen state detection circuit is incorporated in electronic equipment having a touch sensor of a capacitive system made of planarly disposed multiple sensor electrodes. The pen state detection circuit is configured to perform acquiring, from the touch sensor, signal distribution indicating a change in capacitance associated with approach of a pen-side electrode included in an electronic pen, and estimating a state of the electronic pen according to an input-output model. In the input-output model features relating to the acquired signal distribution are input and a state quantity of the electronic pen is output. The pen state detection circuit is configured to be capable of setting an input-output model that is different depending on a change in an outer shape of the electronic pen or the electronic equipment.

20 Claims, 15 Drawing Sheets

(56) References Cited

U.S. PATENT DOCUMENTS

| | | | |
|---|---|---|---|
| 2009/0085892 A1* | 4/2009 | Ishikura | B60K 35/90 |
| | | | 345/174 |
| 2012/0032916 A1 | 2/2012 | Enoki | |
| 2013/0082950 A1 | 4/2013 | Lim et al. | |
| 2014/0078105 A1 | 3/2014 | Son | |
| 2017/0277294 A1* | 9/2017 | Wang | G06F 3/0418 |
| 2020/0159386 A1 | 5/2020 | Saito et al. | |
| 2023/0394721 A1 | 12/2023 | Kadowaki | |
| 2024/0053835 A1* | 2/2024 | Maeyama | G06F 3/03545 |

* cited by examiner

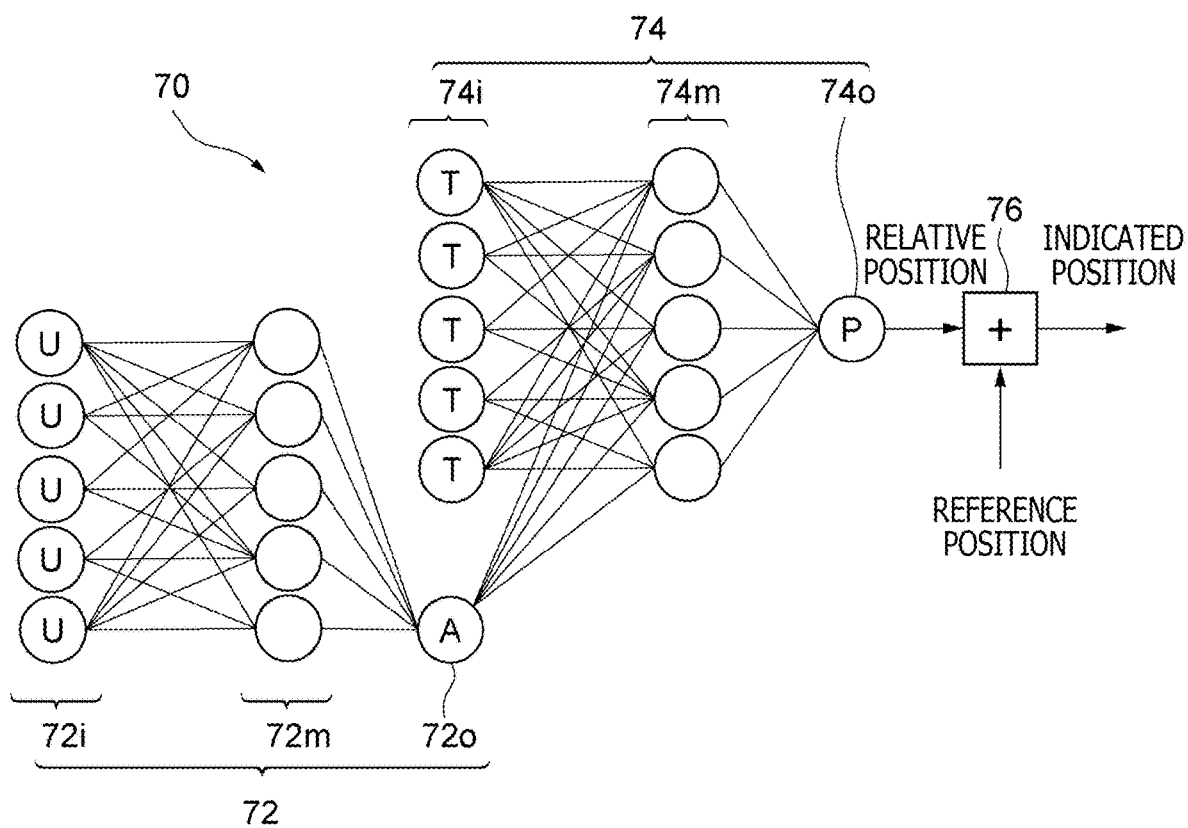

| PEN TYPE | SENSOR CURVING DEGREE | PARAMETER SET NAME |
|---|---|---|
| PEN A1 | ABSENT | ParaSet-11 |
| | LOW | ParaSet-12 |
| | HIGH | ParaSet-13 |
| PEN A2 | ABSENT | ParaSet-14 |
| | LOW | ParaSet-15 |
| | HIGH | ParaSet-16 |
| ... | ... | ... |

| SENSOR TYPE | EQUIPMENT TYPE | FILM STATE | PARAMETER SET NAME |
|---|---|---|---|
| SENSOR B | TABLET C1 | ABSENT | ParaSet-21 |
| | | PRESENT | ParaSet-22 |
| | TABLET C2 | ABSENT | ParaSet-23 |
| | | PRESENT | ParaSet-24 |
| ... | ... | ... | ... |

FIG.13

| PEN TYPE | PEN TIP WEAR DEGREE | PARAMETER SET NAME |
|---|---|---|
| PEN A1 | ABSENT | ParaSet-31 |
| PEN A1 | LOW | ParaSet-32 |
| PEN A1 | HIGH | ParaSet-33 |
| PEN A2 | ABSENT | ParaSet-34 |
| PEN A2 | LOW | ParaSet-35 |
| PEN A2 | HIGH | ParaSet-36 |
| ... | ... | ... |

FIG.14

| PEN TYPE | SENSOR TYPE | PARAMETER SET NAME |
|---|---|---|
| PEN A1 | SENSOR B1 | ParaSet-41 |
| PEN A1 | SENSOR B2 | ParaSet-42 |
| PEN A1 | SENSOR B3 | ParaSet-43 |
| PEN A2 | SENSOR B1 | ParaSet-44 |
| PEN A2 | SENSOR B2 | ParaSet-45 |
| PEN A2 | SENSOR B3 | ParaSet-46 |
| ... | ... | ... |

FIG.15

| USER ID | PEN TYPE | PARAMETER SET NAME |
|---|---|---|
| U0001 | PEN A1 | ParaSet-51 |
| U0002 | PEN A2 | ParaSet-52 |
| U0003 | PEN A1 | ParaSet-53 |
|  | PEN A2 | ParaSet-54 |
| ... | ... | ... |

PEN STATE DETECTION CIRCUIT, METHOD, AND DEVICE, AND PARAMETER SUPPLY DEVICE

BACKGROUND

Technical Field

The present disclosure relates to a pen state detection circuit, a pen state detection method, and a pen state detection device, as well as a parameter supply device.

Description of the Related Art

A writing input system made as a combination of an electronic pen and electronic equipment is known. In this kind of system, it is desirable that an indicated position of the electronic pen be detected by the electronic equipment with high accuracy. For example, in PCT Patent Publication WO2019/013222 (hereinafter, Patent Document 1), a method is disclosed in which an indicated position of an electronic pen is tentatively detected, a position calibration value corresponding to the indicated position is obtained, and the indicated position is corrected according to the position calibration value. More specifically, it is described that a detection value corresponding to an ideal value of the indicated position is obtained by having a user's electronic pen trace a test pattern rendered on a display panel.

As the writing input system is repeatedly used, the outer shape of the electronic pen or of the electronic equipment may be deformed sometimes. Similarly, as this system is continuously used, the combination of the electronic pen and the electronic equipment or the like may change. Accordingly, the geometric relation between a pen-side electrode included in the electronic pen and a sensor electrode incorporated in the electronic equipment may change, which in turn causes the shape pattern tendency of signal distribution indicative of capacitance change to vary.

For example, in the case of defining one input-output model by use of the correction method disclosed in Patent Document 1 and thereafter estimating the state of the electronic pen from signal distribution according to such definitive input-output model, it is possible that the pen state detection accuracy may decrease due to the above-described changes in the outer shape of the pen or the equipment or the combination between a particular pen and equipment. Thus, in the method disclosed in Patent Document 1, a need exists for improvement so as to maintain the detection accuracy.

BRIEF SUMMARY

The present disclosure is made in view of the above-described technical problem, and according to one aspect is directed to providing a pen state detection circuit, a pen state detection method, and a pen state detection device, as well as a parameter supply device that can maintain the pen state detection accuracy irrespective of the use condition of an electronic pen or electronic equipment.

A pen state detection circuit according to a first aspect of the present disclosure is a circuit incorporated in electronic equipment, the electronic equipment having a touch sensor of a capacitive system made of planarly disposed multiple sensor electrodes. The pen state detection circuit performs acquiring, from the touch sensor, signal distribution indicating a change in capacitance associated with approach of a pen-side electrode included in an electronic pen, and estimating a state of the electronic pen according to an input-output model in which features relating to the acquired signal distribution are input and a state quantity of the electronic pen is output. The pen state detection circuit is configured to be capable of setting an input-output model that is different depending on a change in an outer shape of the electronic pen or the electronic equipment.

A pen state detection method according to a second aspect of the present disclosure is a method carried out with use of a pen state detection circuit incorporated in electronic equipment, the electronic equipment having a touch sensor of a capacitive system made of planarly disposed multiple sensor electrodes. The pen state detection method includes acquiring, from the touch sensor, signal distribution indicating a change in capacitance associated with approach of a pen-side electrode included in an electronic pen, and estimating a state of the electronic pen in accordance with an input-output model in which features relating to the acquired signal distribution are input and a state quantity of the electronic pen is output. An input-output model that is set differently depending on a change in an outer shape of the electronic pen or the electronic equipment.

A pen state detection device according to a third aspect of the present disclosure includes the above-described pen state detection circuit, an information acquiring section that acquires model selection information relating to the outer shape of the electronic pen or the electronic equipment, and a parameter setting section that sets, in the pen state detection circuit, model parameters that allow identification of the input-output model corresponding to the model selection information acquired by the information acquiring section.

A parameter supply device according to a fourth aspect of the present disclosure is a device configured to be capable of mutually communicating with a pen state detection device. The pen state detection device includes the above-described pen state detection circuit, an information acquiring section that acquires model selection information relating to the outer shape of the electronic pen or the electronic equipment, and a parameter setting section that sets, in the pen state detection circuit, model parameters that allow identification of the input-output model selected according to the model selection information acquired by the information acquiring section. The parameter supply device includes a storage section that stores the model parameters in such a manner as to associate the model parameters with the model selection information, and a control section that, when receiving the model selection information from the pen state detection device, carries out control of reading out the model parameters corresponding to the model selection information from the storage section and transmitting the model parameters to the pen state detection device.

A pen state detection circuit according to a fifth aspect of the present disclosure is a circuit incorporated in electronic equipment having a touch sensor of a capacitive system made of planarly disposed multiple sensor electrodes. The pen state detection circuit performs acquiring, from the touch sensor, signal distribution indicating a change in capacitance associated with approach of a pen-side electrode included in an electronic pen, and estimating a state of the electronic pen according to an input-output model in which features relating to the acquired signal distribution are input and a state quantity of the electronic pen is output. The pen state detection circuit is configured to be capable of setting an input-output model that is different depending on a combination of two or more of a type of the electronic pen, a type the electronic equipment, a type of the touch sensor, and a user.

A pen state detection method according to a sixth aspect of the present disclosure is a method carried out with use of a pen state detection circuit incorporated in electronic equipment, the electronic equipment having a touch sensor of a capacitive system made of planarly disposed multiple sensor electrodes. The pen state detection method includes acquiring, from the touch sensor, signal distribution indicating a change in capacitance associated with approach of a pen-side electrode included in an electronic pen, and estimating a state of the electronic pen according to an input-output model in which features relating to the acquired signal distribution are input and a state quantity of the electronic pen is output. An input-output model is set differently depending on a combination of two or more of a type of the electronic pen, a type of the electronic equipment, a type of the touch sensor, and a user.

A pen state detection device according to a seventh aspect of the present disclosure includes the above-described pen state detection circuit, an information acquiring section that acquires model selection information relating to the combination of two or more of the types of the electronic pen, the electronic equipment, and the touch sensor, and the user, and a parameter setting section that sets, in the pen state detection circuit, model parameters that allow identification of the input-output model corresponding to the model selection information acquired by the information acquiring section.

A parameter supply device according to an eighth aspect of the present disclosure is a device configured to be capable of mutually communicating with a pen state detection device. The pen state detection device includes the above-described pen state detection circuit, an information acquiring section that acquires model selection information relating to the combination of two or more of a type of the electronic pen, a type of the electronic equipment, a type of the touch sensor, and the user, and a parameter setting section that sets, in the pen state detection circuit, model parameters that allow identification of the input-output model corresponding to the model selection information acquired by the information acquiring section. The parameter supply device includes a storage section that stores the model parameters in such a manner as to associate the model parameters with the model selection information, and a control section that, when receiving the model selection information from the pen state detection device, carries out control of reading out the model parameters corresponding to the model selection information from the storage section and transmitting the model parameters to the pen state detection device.

According to the present disclosure, it becomes possible to maintain the pen state detection accuracy irrespective of the use condition of the electronic pen or the electronic equipment.

BRIEF DESCRIPTION OF THE SEVERAL VIEWS OF THE DRAWINGS

FIG. 7 is a schematic configuration diagram illustrating one example of an input-output model implemented by a touch integrated circuit (IC) of FIG. 2;

FIG. 13 is a diagram illustrating one example of a data structure of a third table of the parameter DB;

FIG. 14 is a diagram illustrating one example of a data structure of a fourth table of the parameter DB;

FIG. 15 is a diagram illustrating one example of a data structure of a fifth table of the parameter DB;

DETAILED DESCRIPTION

Configuration of Input System 10
Overall Configuration

Figure 1:
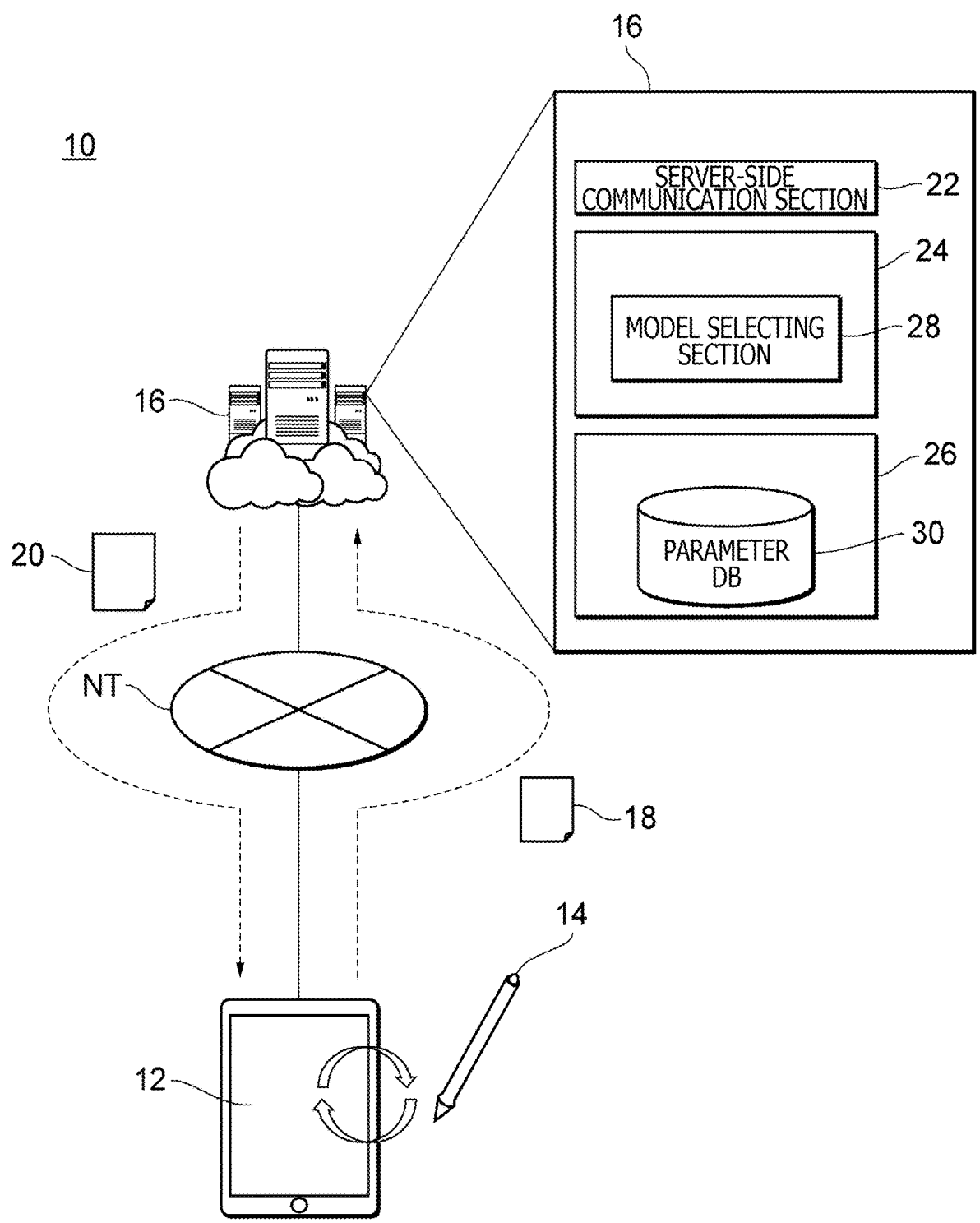
FIG. 1 is an overall configuration diagram of an input system in which electronic equipment as a pen state detection device in one embodiment of the present disclosure is incorporated.

FIG. 1 is an overall configuration diagram of an input system 10 in which electronic equipment 12 is incorporated as a pen state detection device in one embodiment of the present disclosure. The input system 10 is configured to be capable of generating a digital ink (or ink data) with high reproducibility with respect to writing input made with use of an electronic pen 14. As the data format of the digital ink, or so-called "ink description language," Wacom Ink Layer Language (WILL)™, Ink Markup Language (InkML), or Ink Serialized Format (ISF) may be used.

Specifically, the input system 10 includes at least one unit of electronic equipment 12, at least one electronic pen 14, and a server device 16 (corresponding to a "parameter supply device"). Each unit of electronic equipment 12 can mutually communicate with the server device 16 through a network NT.

Figure 2:
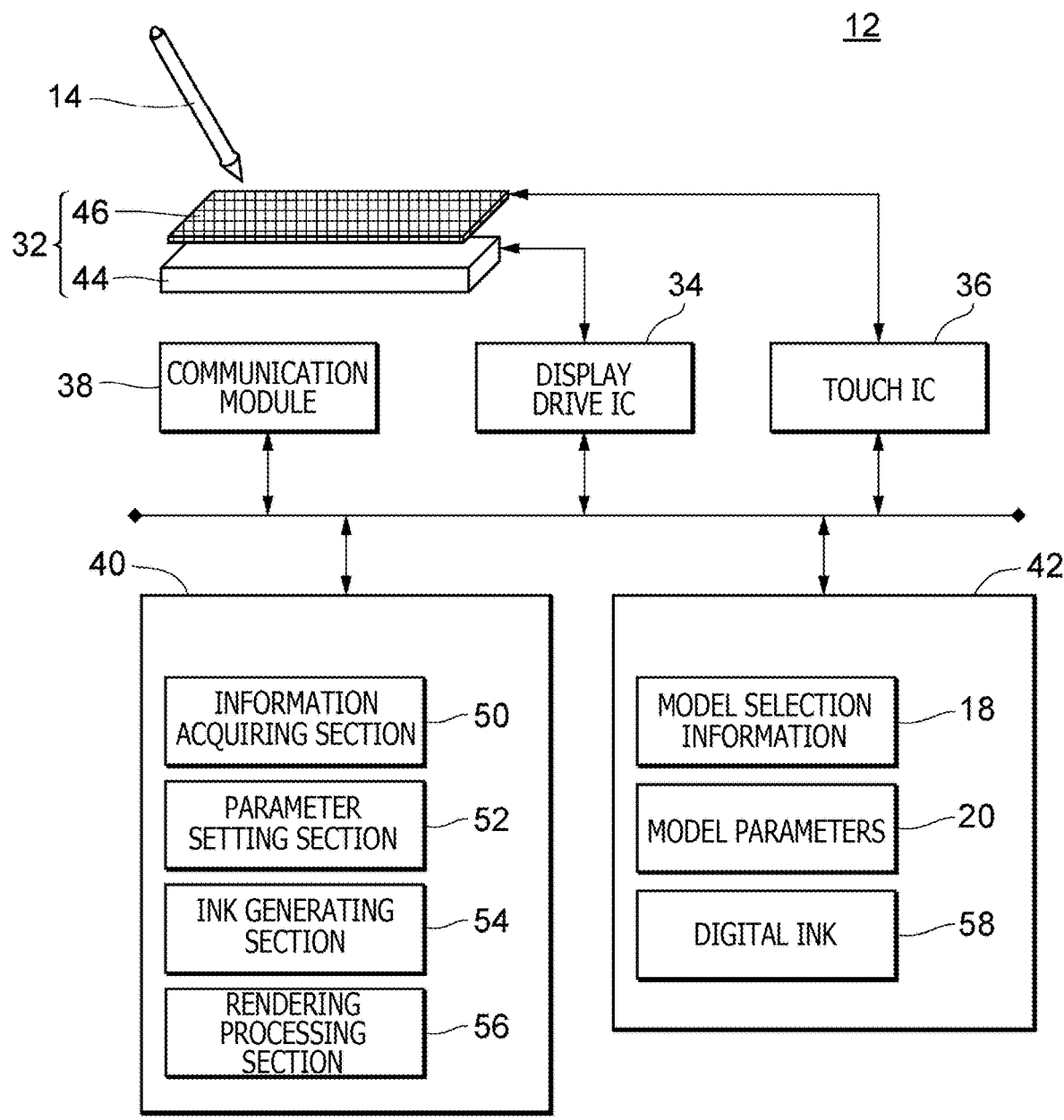
FIG. 2 is a block diagram illustrating one example of the configuration of the electronic equipment of FIG. 1.

The electronic equipment 12 is a general-purpose electronic device or a dedicated electronic device including a touch panel display 32 (FIG. 2). Examples of the general-purpose electronic device include a tablet-type terminal, a smartphone, a personal computer, and so forth. Examples of the dedicated electronic device include a digital signage device (a so-called electronic billboard), a wearable terminal, and so forth.

The electronic pen 14 is a pen-type pointing device and is configured to be capable of communicating with the electronic equipment 12 unidirectionally or bidirectionally through capacitive coupling formed between the electronic pen 14 and the electronic equipment 12. The user can draw pictures or write characters on the electronic equipment 12 by holding the electronic pen 14 and moving the electronic pen 14 while pressing the pen tip against a defined touch surface. The electronic pen 14 is a stylus based on the active capacitive coupling system (AES) or the electromagnetic induction system (EMR), for example.

The server device 16 is a computer that carries out overall control relating to supply of model parameters 20 and may be of either a cloud type or an on-premise type. Here, the server device 16 is diagrammatically represented as a single computer. However, instead, the server device 16 may be formed by a computer group constituting a distributed system. The server device 16 is configured to include a server-side communication section 22, a server-side control section 24, and a server-side storage section 26.

The server-side communication section 22 is an interface that transmits and receives electric signals to and from an external device. This allows the server device 16 to receive model selection information 18 from the electronic equipment 12 and transmit the model parameters 20 to the electronic equipment 12.

The server-side control section 24 includes an arithmetic processing unit including a central processing unit (CPU) and a graphics processing unit (GPU). The server-side control section 24 functions as a model selecting section 28, to be described in detail later, by reading out a program stored in the server-side storage section 26 and executing the program.

The server-side storage section 26 includes a non-transitory, computer-readable storage medium, for example, a hard disk drive (HDD) or a solid state drive (SSD). A database (hereinafter, parameter DB 30) relating to the model parameters 20 is constructed in the server-side storage section 26.

FIG. 2 is a block diagram illustrating one example of the configuration of the electronic equipment 12 of FIG. 1. Specifically, the electronic equipment 12 includes a touch panel display 32, a display drive IC 34, a touch IC 36 (corresponding to a "pen state detection circuit"), a communication module 38, a host processor 40, and a memory 42.

The touch panel display 32 includes a display panel 44 that can display content in a visible manner, and a planar touch sensor 46 disposed to overlap with the display panel 44 in plan view. In the illustrated example, the touch sensor 46 is a sensor of an "external type" attached to the display panel 44 from the outside. However, instead, the touch sensor 46 may be a sensor of a "built-in type" (according to further classification, an on-cell type or in-cell type) configured integrally with the display panel 44.

The display panel 44 can display a monochrome image or a color image, and includes, for example, a liquid crystal panel, an organic electro-luminescence (EL) panel, or an electronic paper. The display panel 44 can have flexibility, to allow the user to perform input operation by handwriting on the touch surface of the electronic equipment 12 that is kept at a curved or bent state.

The touch sensor 46 is a sensor of the capacitive system made of planarly disposed multiple sensor electrodes. Specifically, the touch sensor 46 includes multiple X line electrodes 47 (see FIG. 10A) for detecting the position on an X-axis of a sensor coordinate system and multiple Y line electrodes 48 (see FIG. 10A) for detecting the position on a Y-axis of the sensor coordinate system. In this case, the X line electrodes 47 are provided to extend along the Y-axis direction and are disposed at equal intervals in the X-axis direction. The Y line electrodes 48 are provided to extend along the X-axis direction and are disposed at equal intervals in the Y-axis direction. The touch sensor 46 may be, instead of the above-described sensor of the mutual capacitance system, a sensor of the self-capacitance system in which block-shaped electrodes are disposed in a two-dimensional matrix.

The display drive IC 34 is an integrated circuit that is electrically connected to the display panel 44 and that carries out driving control of the display panel 44. The display drive IC 34 drives the display panel 44 according to a display signal supplied from the host processor 40. As a result, content indicated by digital ink 58 is displayed on the display panel 44.

The touch IC 36 is an integrated circuit that is electrically connected to the touch sensor 46 and that carries out driving control of the touch sensor 46. The touch IC 36 drives the touch sensor 46 according to a control signal supplied from the host processor 40. Accordingly, the touch IC 36 carries out a "pen detection function" of detecting the state of the electronic pen 14 and a "touch detection function" of detecting a touch by a finger or the like of the user.

The pen detection function includes a function to scan the touch sensor 46, a function to receive and analyze a downlink signal, a function to estimate the state of the electronic pen 14 (for example, a position, an orientation, or a writing pressure of the electronic pen 14), and a function to generate and transmit an uplink signal including a command to the electronic pen 14, for example. The touch detection function includes a function to two-dimensionally scan the touch sensor 46, a function to acquire a detection map on the touch sensor 46, and a function to classify a region on the detection map (for example, classification of a finger, a palm, and so forth), for example.

A graphical user interface (GUI) is constructed by combining the input function provided by the electronic pen 14 and the touch sensor 46 and the output function provided by the display panel 44 as described above.

The communication module 38 has a communication function of carrying out wired communication or wireless communication with an external device. This allows the electronic equipment 12 to transmit the model selection information 18 to the server device 16 and receive the model parameters 20 from the server device 16.

The host processor 40 includes an arithmetic processing unit including a CPU, GPU, or a micro-processing unit (MPU). The host processor 40 functions as an information acquiring section 50, a parameter setting section 52, an ink generating section 54, and a rendering processing section 56 by reading out a program stored in the memory 42 and executing the program.

The memory 42 includes a non-transitory, computer-readable storage medium. Here, the computer-readable storage medium is a storing device including an HDD or a portable medium such as a magneto-optical disc, a read only memory (ROM), a compact disc ROM (CD-ROM), or a flash memory. In the illustrated example, the model selection information 18, the model parameters 20, and the digital ink 58 are stored in the memory 42.

Operation of Input System 10

The input system 10 in which the electronic equipment 12 is incorporated as the pen state detection device is configured as described above. Next, description will be made of operation of the input system 10, specifically, cooperative operation of the electronic equipment 12, the electronic pen 14, and the server device 16, with reference to a sequence diagram of FIG. 3. Steps S1 and S9 in this sequence diagram are carried out by cooperation of the electronic pen 14 and the electronic equipment 12. Steps S4 to S6 are carried out by the server device 16. Meanwhile, the remaining steps are carried out by the electronic equipment 12.

Figure 3:
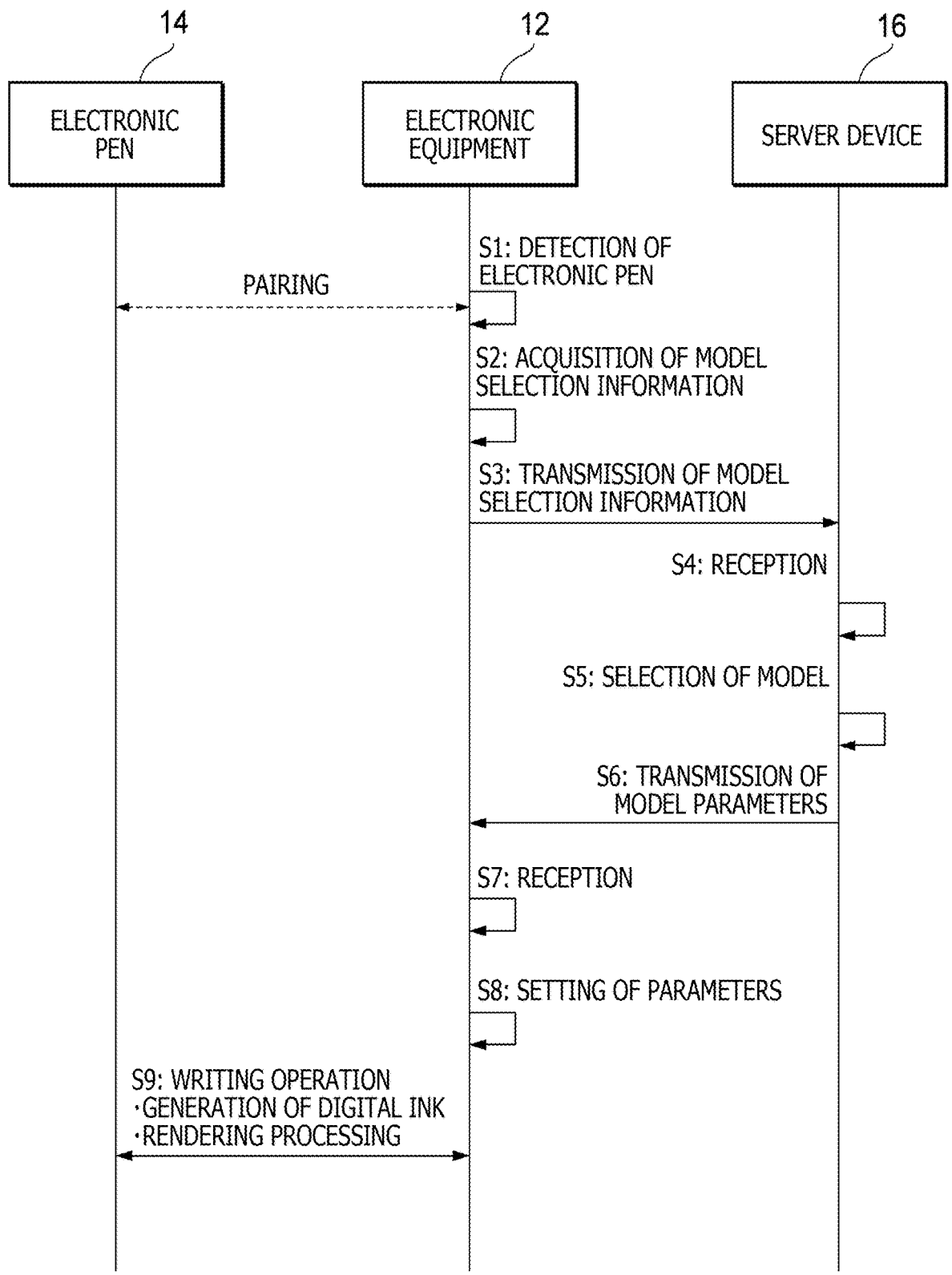
FIG. 3 is a sequence diagram relating to operation of the input system illustrated in FIG. 1.

In step S1 in FIG. 3, the host processor 40 of the electronic equipment 12 detects the electronic pen 14 used by a user to input writing. Specifically, the electronic equipment 12 attempts pairing with the electronic pen 14 that is present nearby and detects the electronic pen 14 through successful pairing. Alternatively, the electronic equipment 12 may detect the electronic pen 14 by receiving user input operation of information relating to the electronic pen 14.

In step S2, the information acquiring section 50 of the electronic equipment 12 acquires the model selection information 18 from the electronic pen 14 and/or from the electronic equipment 12 itself. The model selection information 18 is information necessary for selecting an input-output model 70 to be described later. Specifically, the model selection information 18 is [1] information relating to the outer shape of the electronic pen 14 or the electronic equipment 12 or [2] information relating to a combination of two or more of a type of the electronic pen 14, a type of the electronic equipment 12, a type of the touch sensor 46, and the user.

In step S3, the electronic equipment 12 transmits data including the model selection information 18 acquired in step S2 to the server device 16 in the state in which the data is associated with identification information of the electronic equipment 12 (i.e., equipment identification (ID)).

In step S4, the server device 16 acquires the model selection information 18 through reception of the data from the electronic equipment 12.

In step S5, the server-side control section 24 (more specifically, the model selecting section 28) uses the model selection information 18 acquired in step S4, as a search key, and refers to the parameter DB 30 constructed in the server-side storage section 26. As a result, one set of the model parameters 20 that allows identification of the input-output model 70 corresponding to the model selection information 18 in multiple sets of the model parameters 20 is selected.

In step S6, the server device 16 transmits data including the model parameters 20 selected in step S5 to the electronic equipment 12 having the equipment ID associated with the relevant model selection information 18.

In step S7, the electronic equipment 12 acquires the model parameters 20 through reception of data from the server device 16. The model parameters 20 are stored in the memory 42 of the electronic equipment 12.

In step S8, the host processor 40 (more specifically, the parameter setting section 52) carries out setting the model parameters 20 acquired in step S7, in such a form that the touch IC 36 can use the model parameters 20. For example, the host processor 40 writes each of the respective values of the model parameters 20 to a corresponding memory or a corresponding storage area of a register.

In step S9, the electronic equipment 12 carries out desired writing operation in cooperation with the electronic pen 14. Specifically, the ink generating section 54 generates the digital ink 58 made through association of stroke data indicating the trace of the indicated position of the electronic pen 14 with meta-information relating to the stroke data. The meta-information includes, for example, document meta-data, semantic data, device data, categorization data, context data, and so forth.

The rendering processing section 56 analyzes the digital ink 58 read out from the memory 42 and executes desired rasterization processing for the stroke data to generate a display signal indicating content of the rendering target. The display drive IC 34 drives the display panel 44 according to the display signal supplied from the host processor 40. As a result visualized content is displayed on the display panel 44.

Detection Operation of Pen State

In this manner, the sequence operation illustrated in FIG. 3 ends. Next, the pen state detection operation by the touch IC 36 will be described with reference to FIG. 4 to FIG. 7.

One Example of Input Value and Output Value

Figure 4:
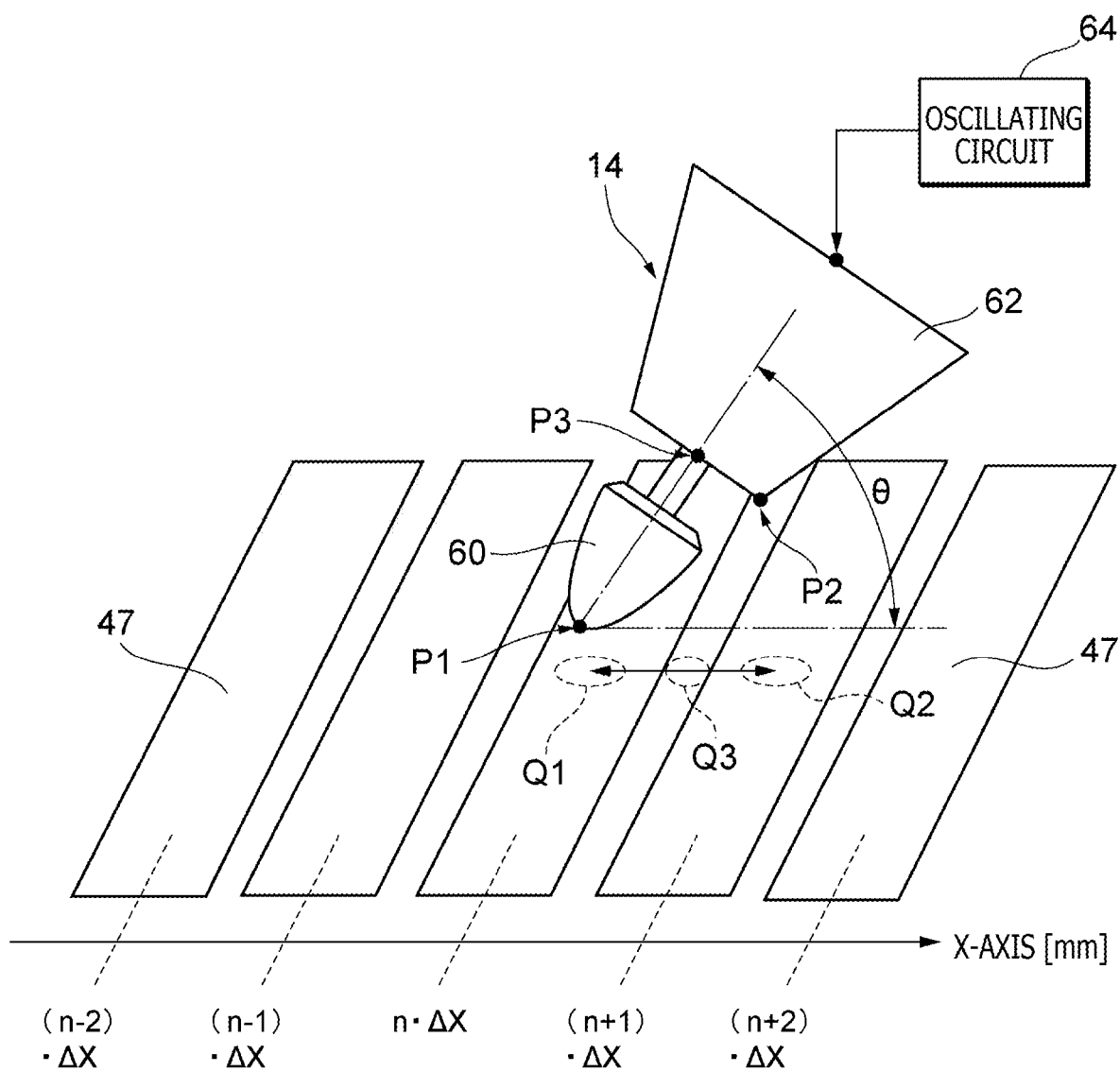
FIG. 4 is a schematic diagram partially illustrating an electronic pen of FIG. 1.

FIG. 4 is a schematic diagram partially illustrating the electronic pen 14 of FIG. 1. At the tip of the electronic pen 14, a tip electrode 60 having a substantially conical shape and an upper electrode 62 having a bottomless truncated conical shape are coaxially disposed. The tip electrode 60 and the upper electrode 62 are each a pen-side electrode for outputting a signal generated by an oscillating circuit 64 (a so-called downlink signal). The oscillating circuit 64 changes the oscillation frequency or switches the transmission destination in a time-division manner. This allows the electronic pen 14 to output two kinds of downlink signals through the tip electrode 60 and the upper electrode 62.

The touch IC 36 (FIG. 2) of the electronic equipment 12 acquires, from the multiple X line electrodes 47, signal distribution indicating a change in the capacitance (more specifically, mutual capacitance or self-capacitance) associated with approach of the tip electrode 60 (hereinafter, first signal distribution). Typically, the first signal distribution has a shape having one peak at a position Q1. Here, the position Q1 corresponds to the position obtained by projecting the top part of the tip electrode 60 (position P1) onto the sensor plane.

Similarly, the touch IC 36 acquires signal distribution indicating a change in the capacitance associated with approach of the upper electrode 62 (hereinafter, second signal distribution) from the multiple X line electrodes 47. Typically, the second signal distribution has a shape having one peak or two peaks at a position Q2. Here, the position Q2 corresponds to the position obtained by projecting the shoulder part (position P2) of the upper electrode 62 onto the sensor plane. Furthermore, a position Q3 to be described later corresponds to the position obtained by projecting the center (position P3) of the upper surface of the truncated conical shape of the upper electrode 62 onto the sensor plane.

Figure 5A:
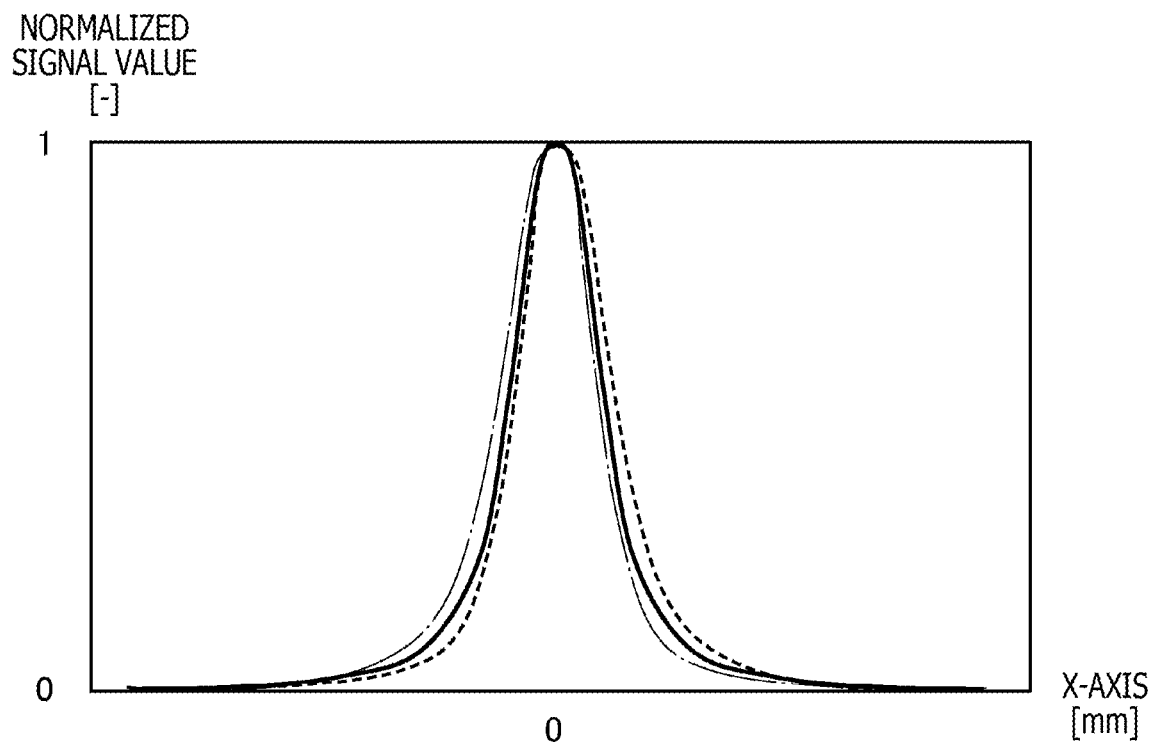
FIG. 5A is a diagram illustrating one example of first signal distribution detected from a touch sensor when the electronic pen is in a contact state.
Figure 5B:
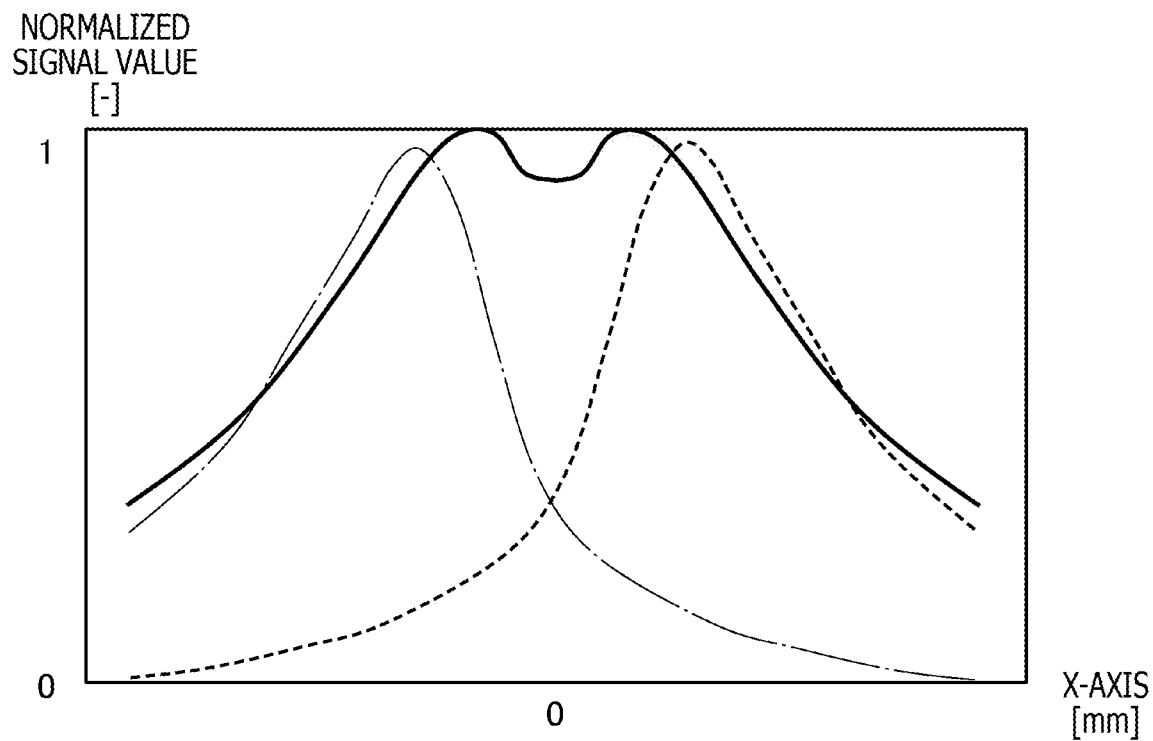
FIG. 5B is a diagram illustrating one example of second signal distribution detected from the touch sensor when the electronic pen is in the contact state.

FIG. 5A and FIG. 5B are diagrams each illustrating one example of signal distribution detected from the touch sensor 46 at the time when the electronic pen 14 is in the contact state. Specifically, FIG. 5A illustrates the first signal distribution, and FIG. 5B illustrates the second signal distribution. The abscissa axis of the graph indicates the relative position (unit: mm) with respect to the indicated position of the electronic pen 14. The ordinate axis of the graph indicates a signal value (unit: none) normalized to [0, 1]. Regarding this signal value, the positive and negative signs are defined in such a manner that the signal value becomes "positive" when the electronic pen 14 approaches. The shape of each of the first signal distribution and the second signal distribution changes according to the inclination angle of the electronic pen 14. In the present diagrams, three curves each obtained with a change in the inclination angle are represented in an overlapped manner.

As illustrated in FIG. 5A, the first signal distribution has a substantially similar shape irrespective of the magnitude of the inclination angle. This is because, while the electronic pen 14 is used, normally the top part of the tip electrode 60 is present at the position closest to the sensor plane and the position Q1 substantially corresponds with the position P1. On the other hand, as illustrated in FIG. 5B, in the second signal distribution, the position or the number of peaks largely changes according to a change in the inclination angle. This is because, while the electronic pen 14 is used, normally, any place on the shoulder part of the upper electrode 62 is present at the position closest to the sensor plane, and the distance between the positions Q1 and Q2 changes according to the inclination angle.

The position and orientation of the electronic pen 14 (hereinafter referred to also as a pen state) can be estimated by using the coordinates of these positions Q1 and Q2. For example, the indicated position is equivalent to the position Q1 illustrated in FIG. 4. Moreover, the inclination angle is equivalent to an angle $\theta$ formed by the sensor plane and the axis of the electronic pen 14. That is, $\theta=0°$ holds in the state in which the electronic pen 14 is horizontal to the sensor plane, and $\theta=90°$ holds in the state in which the electronic pen 14 is perpendicular to the sensor plane. As the physical quantity indicating the tilt state of the electronic pen 14, instead of the above-described angle, the orientation may be used, for example.

Figure 6:
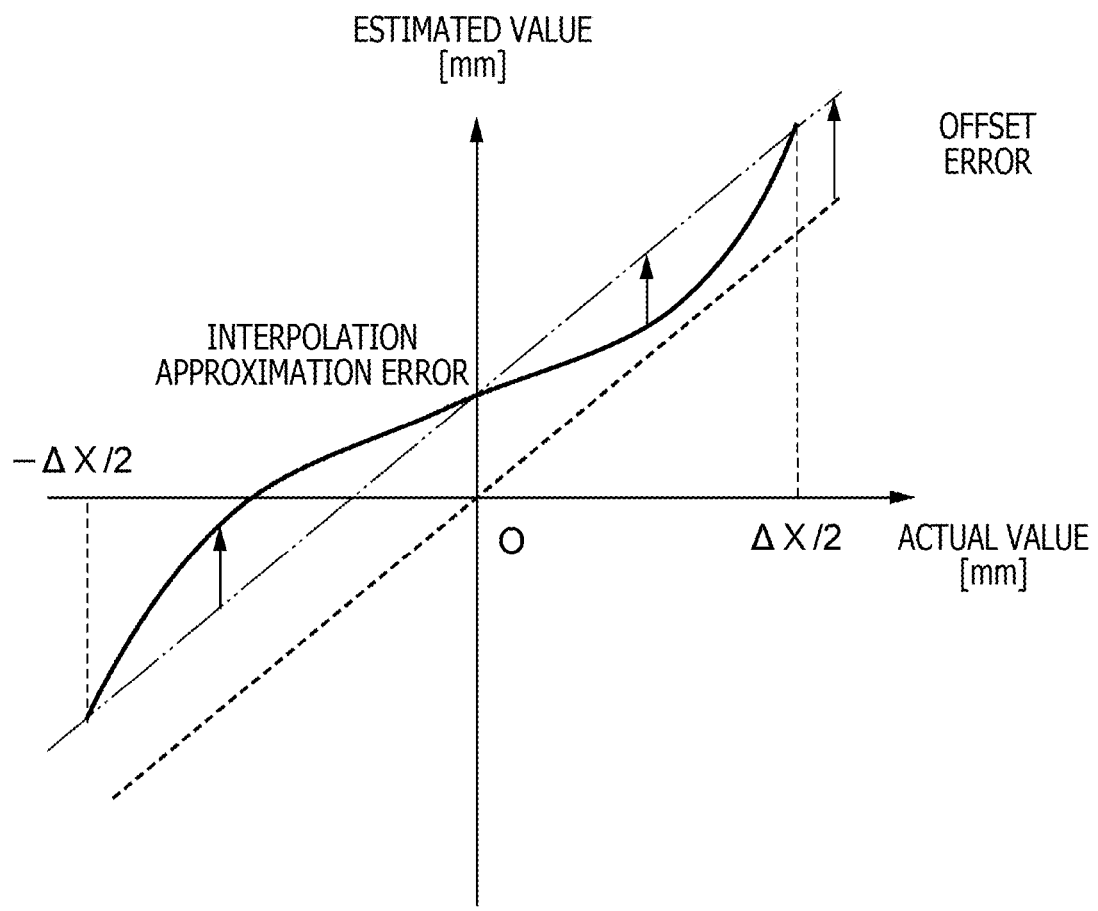
FIG. 6 is a diagram illustrating tendency of an estimation error relating to an indicated position.

FIG. 6 is a diagram illustrating the tendency of an estimation error relating to the indicated position. The abscissa axis of the graph indicates the actual value (unit: mm) of the indicated position and the ordinate axis of the graph indicates the estimated value (unit: mm) of the indicated position. Here, the midpoint of the X line electrode 47 in the width direction is defined as X=0 (mm). When the estimation error is 0, a straight line is obtained that passes through an origin O and has a slope of 1.

For example, because the signal distribution is a collection of signal values sampled at equal intervals (pitch $\Delta X$), interpolation calculation is carried out in order to estimate the peak of the signal distribution (i.e., indicated position) more accurately. However, a fitting error occurs depending on the kind of interpolation function, and an "interpolation approximation error" may occur that is periodic in units of pitch.

In the case of estimating the inclination angle in reference to the position P3 (see FIG. 4) on the upper electrode 62, the position Q2 corresponds with the position Q3 in the case of $\theta=0°$, and hence, an estimation error attributable to the inclination angle does not occur. However, in the case of $\theta>0°$, the inclination angle is estimated to be small due to the gap between the positions Q2 and Q3. As a result, the obtained estimated value shifts in the positive direction (i.e., the inclination direction of the electronic pen 14), and a so-called "offset error" occurs.

As described above, when the pen state is estimated by use of the two pen-side electrodes different from each other in position and shape, the estimation accuracy of the indicated position or the inclination angle varies due to the above-described interpolation approximation error or the offset error. By introducing the following input-output model 70, these two kinds of errors can simultaneously be reduced, so as to improve the pen state estimation accuracy.

Configuration Example of Input-Output Model 70

FIG. 7 is a schematic configuration diagram illustrating one example of the input-output model 70 implemented by the touch IC 36 of FIG. 2. The input-output model 70 is a model in which features relating to the signal distribution are input and the state quantity of the electronic pen 14 is output. Specifically, the input-output model 70 is a neural network formed by sequentially connecting a front-stage calculating section 72, a back-stage calculating section 74, and an adder 76 in series. The network structure is not limited to the example of the present diagram, and various configurations may be employed.

The front-stage calculating section 72 functions as a first estimating section that estimates the inclination angle of the electronic pen 14. The back-stage calculating section 74 and the adder 76 function as a second estimating section that estimates the indicated position of the electronic pen 14. Circle marks in the drawing denote calculation units equivalent to neurons of the neural network. In the calculation units of "T," the respective values of a "first local feature" corresponding to the tip electrode 60 are stored. In the calculation units of "U," the respective values of a "second local feature" corresponding to the upper electrode 62 are stored. The "inclination angle" is stored in the calculation unit of "A." The "relative position" is stored in the calculation unit of "P."

The front-stage calculating section 72 is a hierarchical neural net calculating section including an input layer 72$i$, a middle layer 72$m$, and an output layer 72$o$, for example. The input layer 72$i$ includes N calculation units for inputting the respective values of the second local feature. The middle layer 72$m$ includes M (here, M=N) calculation units. The output layer 72$o$ includes one calculation unit for outputting the inclination angle. Here, the second local feature is a feature indicating shape characteristics of a part of the second signal distribution including the peak (referred to also as "second local distribution"). For example, this second local feature may be the slope of the second local distribution or the absolute value of the slope or may be the second local distribution itself.

The back-stage calculating section 74 is a hierarchical neural net calculating section including an input layer 74$i$, a middle layer 74$m$, and an output layer 74$o$, for example. The input layer 74$i$ includes (N+1) calculation units for inputting the respective values of the first local feature and the inclination angle. The middle layer 74$m$ includes M (here, M=N) calculation units, for example. The output layer 74$o$ includes one calculation unit for outputting the relative position between the reference position and the indicated position. Here, the first local feature is a feature indicating shape characteristics of a part of the first signal distribution including the peak (referred to also as "first local distribution"). For example, this first local feature may be the slope of the first local distribution or the absolute value of the slope or may be the first local distribution itself.

The adder 76 outputs the indicated position of the electronic pen 14 by adding the relative position output from the back-stage calculating section 74 to the position of the reference point of the first local distribution in the sensor coordinate system (i.e., the reference position). For example, this reference position may be any of the rising position, the falling position, or the peak position of the first local distribution, or a neighboring position thereof. The indicated position is a position corresponding to the peak center of the first local distribution and has a higher resolution than the pitch of the X line electrodes 47 (or the Y line electrodes 48).

The calculation rule of the input-output model 70 is defined depending on the respective values of the model parameters 20. For example, the model parameters 20 include "variable parameters" and "fixed parameters." The variable parameters include a coefficient that describes an activation function of the calculation unit, or the connection strength between calculation units. The fixed parameters (or so-called hyperparameters) identify the architecture of a learning model. Examples of the hyperparameters include the number of calculation units that configure each layer, or the number of middle layers. For example, when the architecture is fixed, the model parameters 20 may include only the variable parameters.

The model parameters 20 are determined through "supervised learning" with use of training data obtained by actual measurement or computer simulation. For example, in the case of the "actual measurement," the training data is created by random selection of multiple positions on the sensor plane and measurement of the signal distribution at each position. In the case of the "computer simulation," the training data is created by use of physics simulation including electromagnetic field analysis or electrical circuit analysis, or mathematical simulation including sampling processing, interpolation processing, or noise addition.

Then, the touch IC 36 supplies data including the indicated position and the inclination angle estimated according to the input-output model 70 to the host processor 40. For example, the touch IC 36 may repeat one-dimensional model calculation twice and estimate each of an X-axis coordinate value and a Y-axis coordinate value and supply the coordinate values (X, Y) of the indicated position to the host processor 40. Alternatively, the touch IC 36 may carry out two-dimensional model calculation one time, to simultaneously estimate the coordinate values (X, Y) of the indicated position, and supply the coordinate values (X, Y) to the host processor 40.

Selection of Model Parameters 20

As the input system 10 is repeatedly used, the outer shape of the electronic pen 14 or the electronic equipment 12 may be deformed sometimes. This "change in the outer shape (or change in terms of the outer shape)" means that the shape viewed from the outside (so-called appearance) physically changes. Alternatively, the "change in terms of the outer shape" refers to deformation accompanied by a dynamic change in the electrical or magnetic coupling state of the interface between the electronic pen 14 and the electronic equipment 12 that changes depending on the time (use condition over time), despite that the same product, pen tip type, or sensor electrode product are statically indicated by the same information. That is, the change in the outer shape may be either [1] a reversible change including curving and bending or [2] an irreversible change including partial wear or replacement, or integration or removal of another component.

Similarly, as the input system 10 is repeatedly used, the combination of the electronic pen 14 and the electronic equipment 12 may change. Accordingly, the geometric relation between the pen-side electrode included in the electronic pen 14 and the sensor electrode incorporated in the electronic equipment 12 is changed, which in turn causes the shape pattern tendency of signal distribution indicative of capacitance change to vary. As a result, if the input-output model 70 is fixedly implemented, it may become difficult to sufficiently ensure the pen state detection accuracy.

As such, the server device 16 holds multiple sets of the model parameters 20 different in the input-output characteristics, and selects and supplies one set of the model parameters 20 suitable for the use condition of the electronic pen 14 or the electronic equipment 12. Selection operation of the model selecting section 28 in step S5 in FIG. 3 will be described below with reference to FIG. 8A to FIG. 15.

First Example

Figure 8A:
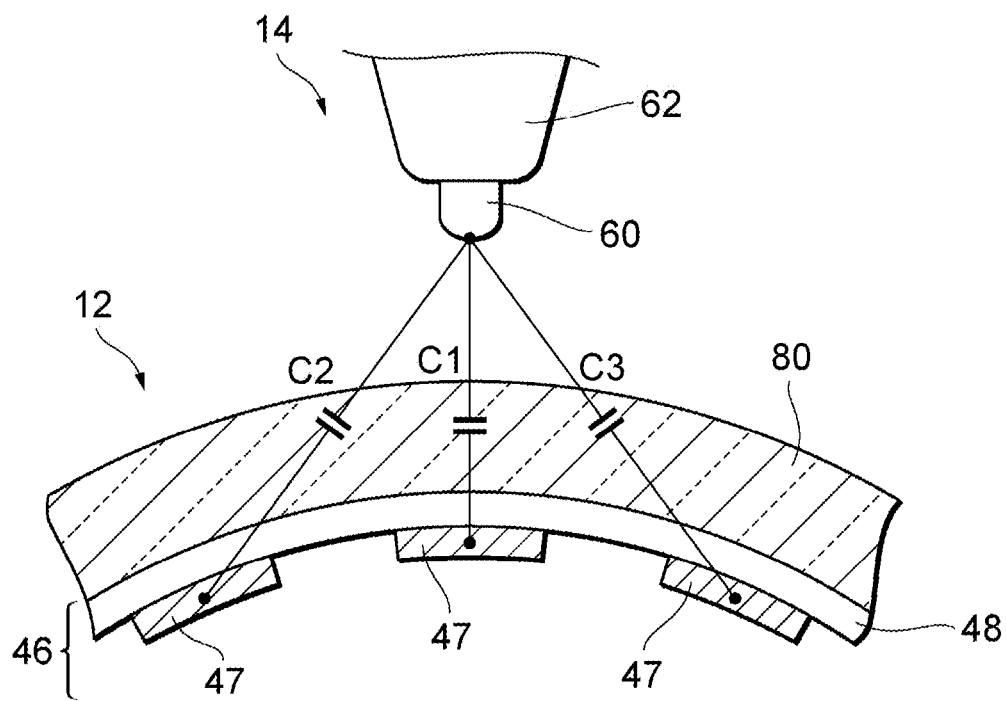
FIG. 8A is a schematic sectional view illustrating the state in which a touch surface of the electronic equipment curves in an upwardly protruding shape.

FIG. 8A is a schematic sectional view illustrating the state in which the touch surface of the electronic equipment 12 curves into an upwardly protruding shape. In the example of the present diagram, the state in which the X line electrodes 47, the Y line electrode 48, and a surface cover 80 are stacked from the lower side to the upper side is illustrated. When the electronic pen 14 approaches the touch surface of the electronic equipment 12, capacitive coupling is formed between the tip electrode 60 and each of three X line electrodes 47 present at positions relatively close to the tip electrode 60. Suppose that, in the following description, the capacitances at the center, on the left side, and on the right side of the drawing are C1, C2, and C3, respectively. As is understood from the present diagram, the geometric positional relation between the tip electrode 60 and the X line electrodes 47 changes depending on whether or not the electronic equipment 12 is curved and the curvature thereof. Correspondingly, the relative magnitude relation among the capacitances C1, C2, and C3 changes.

Figure 8B:
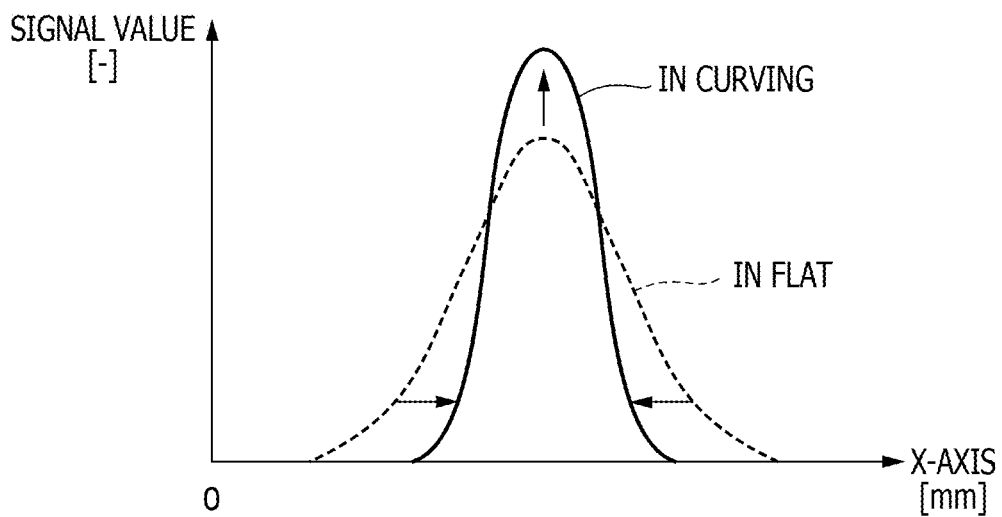
FIG. 8B is a diagram illustrating a change in signal distribution between before and after the curving of the touch surface.

FIG. 8B is a diagram illustrating change in signal distribution between before and after the curving of the touch surface. The abscissa axis of the graph indicates the position (unit: mm) in the X-axis direction, and the ordinate axis of the graph indicates the signal value (unit: none). As is understood from the present diagram, the signal distribution of "in curving" (when curved) has such a tendency that the width becomes narrower and the peak becomes higher compared with the case of "in flat." Thus, in consideration of such a difference in the distribution shape, multiple sets of the model parameters 20 suitable for the case in which the touch surface of the electronic equipment 12 is flat or the case in which the touch surface is curved or bent are prepared.

Figures 9, 10A:
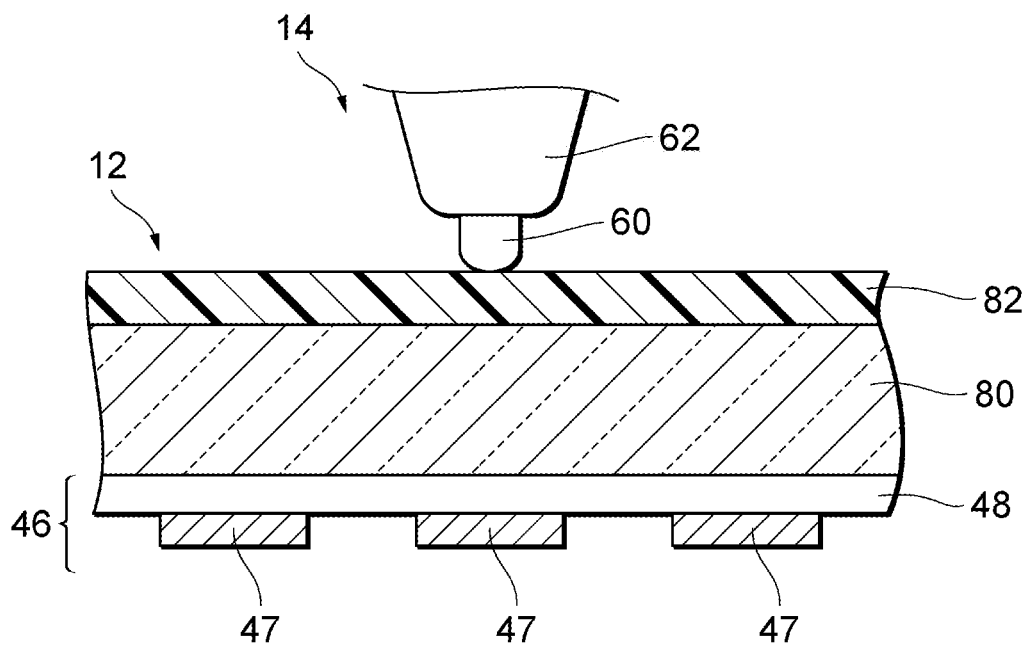
FIG. 9 is a diagram illustrating one example of a data structure of a first table of a parameter database (DB)
FIG. 10A is a schematic sectional view illustrating the state in which a protective film is stuck to the touch surface of the electronic equipment.

FIG. 9 is a diagram illustrating a first example of a data structure of the parameter DB 30 of FIG. 1. A first table of the parameter DB 30 is data of a table format indicating the correspondence relation between "pen type" indicating the type of the electronic pen 14, "sensor curving degree" indicating the degree of curving of the touch sensor 46, and "parameter set name" indicating the set name of the model parameters 20. The "pen type" is classified according to the product name, model number, production lot, manufacturer, or the like, of the electronic pen 14. The "sensor curving degree" may be qualitatively classified as "absent," "present," "low," "high," and so forth, or may be quantitatively classified according to the curvature, the bending angle, or the like.

In this case, the information acquiring section 50 of the electronic equipment 12 acquires each of the pen type and the sensor curving degree as the model selection information 18 (step S2 in FIG. 3). The pen type may be type information included in a downlink signal from the electronic pen 14 or may be type information input through operation of the electronic equipment 12 by the user. Moreover, the sensor curving degree may be a detection value by a strain sensor (not illustrated) disposed in the touch sensor 46 or may be a measurement value input through operation of the electronic equipment 12 by the user.

When the model selection information 18 includes information relating to the outer shape of the electronic equipment 12 as in the first example, the input-output model 70 that is different depending on whether the touch surface of the electronic equipment 12 is flat or curved or bent may be selected. This enables detection of a pen state suitable for the bending state of the touch sensor 46.

Second Example

FIG. 10A is a schematic sectional view illustrating the state in which a protective film 82 is stuck to the touch surface of the electronic equipment 12. In the example of the present diagram, the state in which the X line electrodes 47, the Y line electrode 48, the surface cover 80, and the protective film 82 are stacked from the lower side to the upper side is illustrated. The protective film 82 is an optional component that can be stuck by the user of the electronic equipment 12 as needed. As is understood from the present diagram, in the state in which the tip electrode 60 of the electronic pen 14 is in contact with the touch surface of the electronic equipment 12, the separation distance between the tip electrode 60 and the X line electrode 47 (or the Y line electrode 48) changes depending on whether or not the protective film 82 is present or the thickness thereof. Due to this, the magnitude of capacitance formed in association with capacitive coupling changes.

Figures 10B, 11:
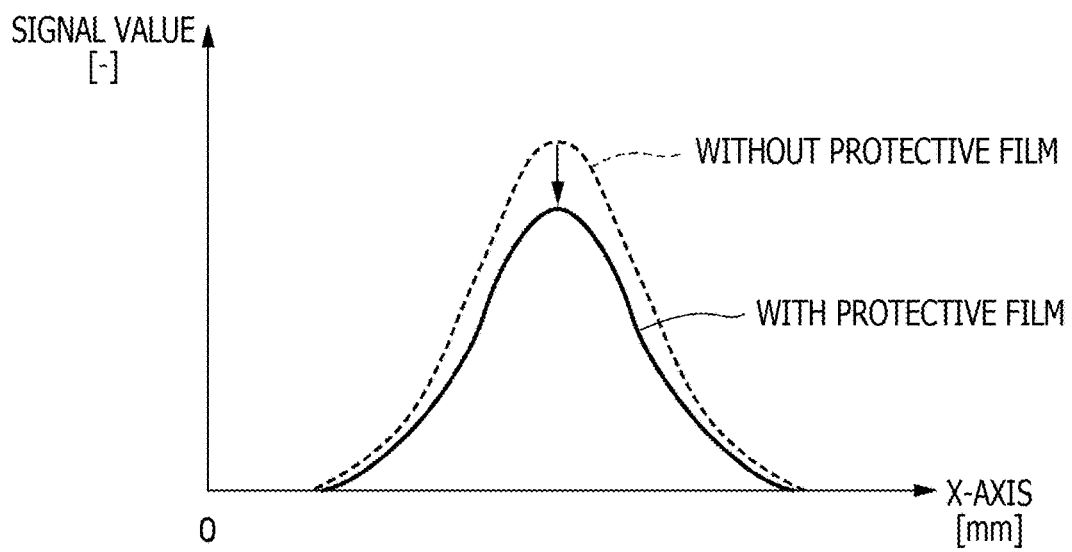
FIG. 10B is a diagram illustrating a change in signal distribution between before and after the sticking of the protective film.
FIG. 11 is a diagram illustrating one example of a data structure of a second table of the parameter DB.

FIG. 10B is a diagram illustrating a change in signal distribution between before and after the sticking of the protective film 82. The abscissa axis of the graph indicates the position (unit: mm) in the X-axis direction, and the ordinate axis of the graph indicates the signal value (unit: none). As is understood from the present diagram, the signal distribution of "with protective film" has such a tendency that the level of the signal value becomes lower across the board compared with the case of "without protective film." Thus, in consideration of such a difference in the distribution shape, multiple sets of the model parameters 20 corresponding to whether or not the protective film 82 is disposed on the touch surface of the electronic equipment 12 or the thickness of the protective film 82 are prepared.

FIG. 11 is a diagram illustrating a second example of the data structure of the parameter DB 30 of FIG. 1. A second table of the parameter DB 30 is data of a table format indicating the correspondence relation between "sensor type" indicating the type of the touch sensor 46, "equipment type" indicating the type of the electronic equipment 12, "film state" indicating the covering state of the protective film 82, and the "parameter set name" indicating the set name of the model parameters 20. The "sensor type" is classified according to the product name, model number, production lot, manufacturer, or the like of the touch sensor 46, for example. The "equipment type" is classified according to the product name, model number, production lot, manufacturer, or the like of the electronic equipment 12, for example. The "film state" is classified according to the presence or absence, thickness, product name, or the like of the protective film 82, for example. Specifically, the "film state" may be qualitatively classified as "absent," "present," "thin," "thick," and so forth, or may be quantitatively classified according to the measurement value of the thickness (unit: μm) or the like.

In this case, the information acquiring section 50 of the electronic equipment 12 acquires each of the sensor type, the equipment type, and the film state as the model selection information 18 (step S2 in FIG. 3). The sensor type may be type information stored in an electronic component that configures the electronic equipment 12 (for example, touch IC 36) or may be type information input through operation of the electronic equipment 12 by the user. The equipment type may be type information stored in the memory 42 of the electronic equipment 12. Further, the film state may be state information input through operation of the electronic equipment 12 by the user.

When the model selection information 18 includes information relating to the outer shape of the electronic equipment 12 as in the second example, the input-output model 70 that is different depending on whether or not the protective film 82 is disposed on the touch surface of the electronic equipment 12 or the thickness of the protective film 82 may be selected. This enables detection of a pen state suited for the covering state of the protective film 82.

Third Example

Figure 12A:
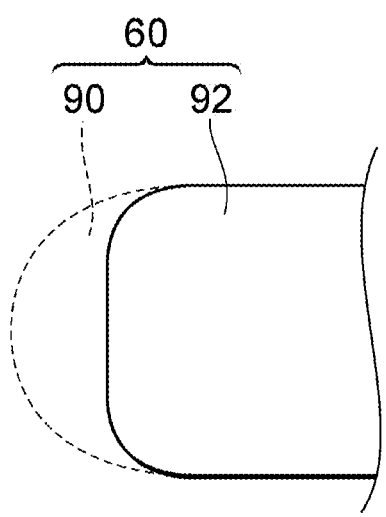
FIG. 12A is a schematic side view illustrating the state in which a tip electrode of the electronic pen has been worn out.

FIG. 12A is a schematic side view illustrating the state in which the tip electrode 60 of the electronic pen 14 is worn out. The user carries out writing operation while bringing the end part of the electronic pen 14 into contact with the touch surface of the electronic equipment 12. Then, from the tip electrode 60 in the initial state, a worn-out part 90 is removed due to wear, so that the tip electrode 60 is deformed into a remaining part 92 having a dull tip shape. That is, the geometric relation between the tip electrode 60 and the sensor electrode (for example, the X line electrode 47) changes, and signal distribution is deformed correspondingly.

Figure 12B:
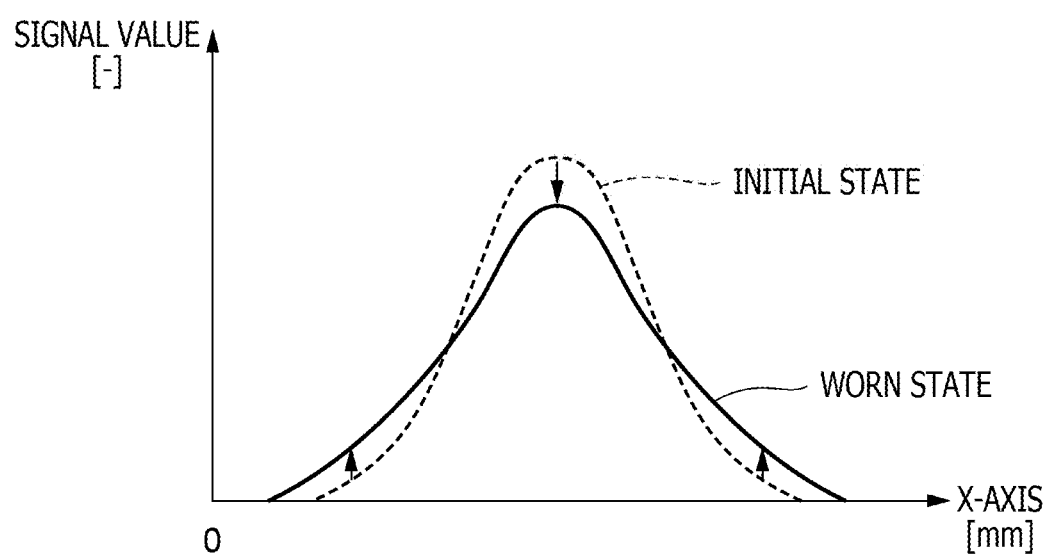
FIG. 12B is a diagram illustrating a change in signal distribution between before and after the wearing-out of the tip electrode.

FIG. 12B is a diagram illustrating a change in signal distribution between before and after the wear of the tip electrode 60. The abscissa axis of the graph indicates the position (unit: mm) in the X-axis direction and the ordinate axis of the graph indicates the signal value (unit: none). As is understood from the present diagram, the signal distribution of "worn state" has such a tendency that the width becomes wider and the peak becomes lower compared with the case of "initial state." Hence, in consideration of such a difference in the distribution shape, multiple sets of the model parameters 20 corresponding to whether or not the tip electrode 60 is worn or the degree of the wear are prepared.

FIG. 13 is a diagram illustrating a third example of the data structure of the parameter DB 30 of FIG. 1. A third table of the parameter DB 30 is data of a table format indicating the correspondence relation between the "pen type" indicating the type of the electronic pen 14, "pen tip wear degree" indicating whether or not the tip electrode 60 is worn or the degree thereof, and the "parameter set name" indicating the set name of the model parameters 20. The "pen type" is classified according to the product name, model number, production lot, manufacturer, or the like of the electronic pen 14, for example. The "pen tip wear degree" may be qualitatively classified as "absent," "present," "low," "high," and so forth, or may be quantitatively classified according to the length of the worn part 90, the length or curvature of the remaining part 92, or the like.

In this case, the information acquiring section 50 of the electronic equipment 12 acquires each of the pen type and the pen tip wear degree as the model selection information 18 (step S2 in FIG. 3). The pen type may be type information included in a downlink signal from the electronic pen 14 or may be type information input through operation of the electronic equipment 12 by the user. The pen tip wear degree may be a measurement value obtained through an image of the tip electrode 60 captured by a camera or analysis processing of the image, or may be a measurement value input through operation of the electronic equipment 12 by the user.

When the model selection information 18 includes information relating to the outer shape of the electronic pen 14 as in the third example, the input-output model 70 that is different depending on whether or not the tip electrode 60 is worn or the degree of the wear may be selected. This enables detection of a pen state suitable for the wear state of the tip electrode 60.

Fourth Example

Even in the ideal state without any change in the outer shape of the electronic pen 14 or the electronic equipment 12, the appearance tendency of signal distribution differs depending on the combination of the electronic pen 14 and the touch sensor 46 in some cases. In view of such a difference in the distribution shape, multiple sets of the model parameters 20 corresponding to different combinations of the types of the electronic pen 14 and the touch sensor 46 may be prepared.

FIG. 14 is a diagram illustrating a fourth example of the data structure of the parameter DB of FIG. 1. A fourth table of the parameter DB 30 is data of a table format indicating the correspondence relation between the "pen type" indicating the type of the electronic pen 14, the "sensor type" indicating the type of the touch sensor 46, and the "parameter set name" indicating the set name of the model parameters 20. Specific examples of the pen type and the sensor type are similar to those of the cases of the above-described first to third examples, and hence, detailed description thereof is omitted.

When the model selection information 18 includes the type of the electronic pen 14 and the type of the touch sensor 46 as in the fourth example, the input-output model 70 that is different depending on the combination of the electronic pen type and the touch sensor type may be selected. This enables detection of a pen state suitable for the combination of the electronic pen 14 and the touch sensor 46.

Fifth Example

For example, even with the same electronic pen 14, the appearance tendency of signal distribution may differ depending on how the user holds the electronic pen 14 in some cases. In view of such a difference in the distribution shape, multiple sets of the model parameters 20 corresponding to the combinations of the user and equipment (for example, the electronic pen 14) may be prepared.

FIG. 15 is a diagram illustrating a fifth example of the data structure of the parameter DB 30 of FIG. 1. A fifth table of the parameter DB 30 is data of a table format indicating the correspondence relation between "user ID" indicating identification information of the user, the "pen type" indicating the type of the electronic pen 14, and the "parameter set name" indicating the set name of the model parameters 20. The "user ID" is identification information singularly managed by the server device 16. The "pen type" is classified according to the product name, model number, production lot, manufacturer, or the like of the electronic pen 14 as in the first example.

In this case, the information acquiring section 50 of the electronic equipment 12 acquires each of the user ID and the pen type as the model selection information 18 (step S2 in FIG. 3). The user ID may be account information of a generation application of the digital ink 58, or may be a host name given to the electronic equipment 12. The pen type may be type information included in a downlink signal from the electronic pen 14 or may be type information input through operation of the electronic equipment 12 by the user.

When the model selection information 18 includes the type of any one of the electronic pen 14, the electronic equipment 12, and the touch sensor 46 as in the fifth example, the input-output model 70 that is different depending on the combination of this type and the user may be selected. This enables detection of a pen state suited for the tendency of how the user uses (e.g., holds) various kinds of equipment.

Sixth Example

Although the combinations including the type of the electronic pen 14 have been described in the fourth and fifth examples, the combination is not limited thereto, and various configurations may be considered. Specifically, a combination of two or more of various types including a type of the electronic pen 14, a type of the electronic equipment 12, a type of the touch sensor 46, and the user may be employed. Alternatively, a combination may be employed which further includes a change in terms of the outer shape of the electronic pen 14 or the electronic equipment 12 in the above-described first to third examples.

Effects of Embodiments

As described above, the touch IC 36 as the pen state detection circuit is incorporated in the electronic equipment 12 having the touch sensor 46 of the capacitive system made of planarly disposed multiple sensor electrodes. The touch IC 36 acquires, from the touch sensor 46, signal distribution indicating a change in the capacitance associated with approach of the pen-side electrode of the electronic pen 14 (tip electrode 60, upper electrode 62), and estimates the state of the electronic pen 14 according to the input-output model 70. In the input-output model 70 features relating to this signal distribution are input and the state quantity of the electronic pen 14 is output. The touch IC 36 is configured to be capable of setting the input-output model 70 that is different depending on the change in terms of the outer shape of the electronic pen 14 or the electronic equipment 12.

Moreover, the electronic equipment 12 as the pen state detection device includes, besides the above-described touch IC 36, the information acquiring section 50 that acquires the model selection information 18 relating to the outer shape of the electronic pen 14 or the electronic equipment 12 and the parameter setting section 52 that sets, in the touch IC 36, the model parameters 20 that allow identification of the input-output model 70 corresponding to the acquired model selection information 18.

Further, the server device 16 as the parameter supply device is configured to be capable of mutually communicating with the above-described electronic equipment 12. The server device 16 includes the server-side storage section 26 that stores the model parameters 20 in such a manner as to associate the model parameters 20 with the model selection information 18, and the server-side control section 24 that, when receiving the model selection information 18 from the electronic equipment 12, carries out control of reading out the model parameters 20 corresponding to the model selection information 18 from the server-side storage section 26 and transmitting the model parameters 20 to the electronic equipment 12. In particular, when the electronic equipment 12 is capable of bidirectionally communicating with the server device 16, the parameter setting section 52 of the electronic equipment 12 may acquire the model parameters 20 corresponding to the model selection information 18 from the server device 16 and set the model parameters 20.

The configuration described above makes it possible to selectively set the input-output model 70 suitable for the use condition of the electronic pen 14 or the electronic equipment 12 (particularly, change in terms of the outer shape thereof) and to maintain the pen state detection accuracy.

Further, the touch IC 36 acquires, from the touch sensor 46, signal distribution indicating a change in the capacitance associated with approach of the pen-side electrode included in the electronic pen 14, and estimates the state of the electronic pen 14 according to the input-output model 70 in which features relating to the acquired signal distribution are input and the state quantity of the electronic pen 14 is output. The touch IC 36 is configured to be capable of setting the input-output model 70 that is different depending on a combination of two or more of a type of the electronic pen 14, a type of the electronic equipment 12, a type of the touch sensor 46, and the user.

Further, the electronic equipment 12 includes, besides the above-described touch IC 36, the information acquiring section 50 that acquires the model selection information 18 relating to the combination of two or more of such elements as a type of the electronic pen 14, a type of the electronic equipment 12, a type of the touch sensor 46, and the user, and the parameter setting section 52 that sets, in the touch IC 36, the model parameters 20 that allow identification of the input-output model 70 corresponding to the acquired model selection information 18. Further, the server device 16 includes the server-side storage section 26 that stores the model parameters 20 in association with the model selection information 18, and the server-side control section 24 that, when receiving the model selection information 18 from the electronic equipment 12, carries out control of reading out the model parameters 20 corresponding to the model selection information 18 from the server-side storage section 26 and transmitting the model parameters 20 to the electronic equipment 12.

The configuration described above makes it possible to selectively set the input-output model 70 suitable for the use condition of the electronic pen 14 and the electronic equipment 12 (in combination, in particular) by the user and to maintain the pen state detection accuracy.

Furthermore, the electronic equipment 12 may be configured to be capable of setting the input-output model 70 in such a manner that detection of the electronic pen 14 serves as a trigger for carrying out the setting. Accordingly, a suitable input-output model 70 can be set when the electronic pen 14 is in actual use.

MODIFICATION EXAMPLES

It is obvious that the present disclosure is not limited to the above-described embodiments and can freely be changed without departing from the principles disclosed therein. Alternatively, the respective configurations may freely be combined to the extent no technical contradiction occurs.

First Modification Example

Figure 16:
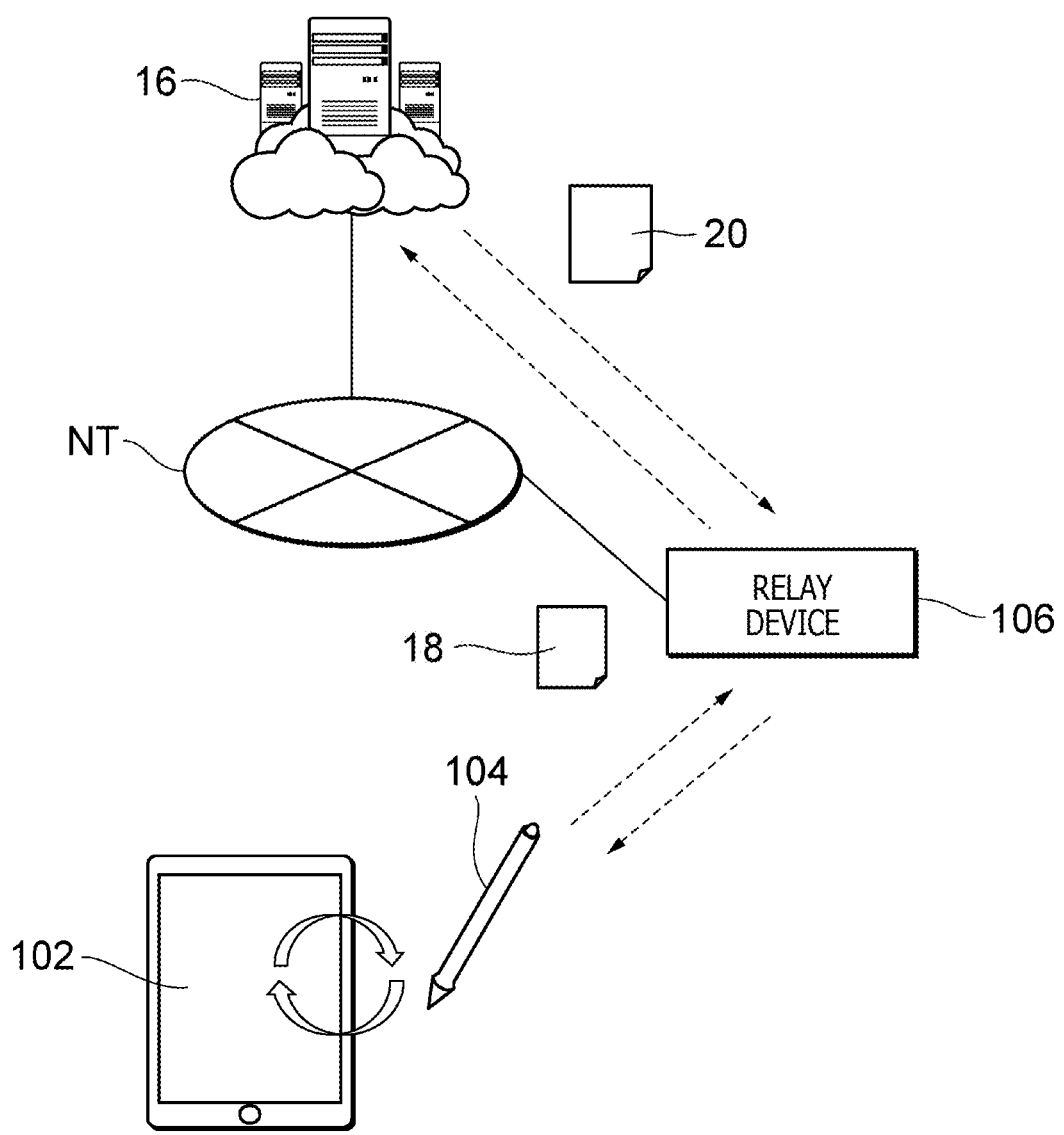
FIG. 16 is an overall configuration diagram of an input system in a first modification example.

FIG. 16 is an overall configuration diagram of an input system 100 in a first modification example. The input system 100 includes at least one unit of electronic equipment 102, at least one electronic pen 104, and the server device 16 having a configuration similar to that of the case of FIG. 1.

Basically, the electronic equipment 102 has a configuration similar to that of the electronic equipment 12 illustrated in FIG. 2. However, the case is assumed in which the function of the communication module 38 is set to be stopped and the electronic equipment 102 is used offline.

The electronic pen 104 has a wireless communication function to carry out wireless communication with an external device by using a wireless communication technology different from that used in the pen-side electrode, for example, Bluetooth (registered trademark), WiFi, 5th generation mobile communication system (what is generally called 5G), or the like. This allows each electronic pen 104 to connect to the network NT through a relay device 106.

The above-described input system 100 can carry out similar operation along the sequence illustrated in FIG. 3. For example, in step S3, the electronic equipment 102 transmits, to the electronic pen 104, an uplink signal including the model selection information 18 acquired in step S2 and identification information of the electronic equipment 102 (i.e., equipment ID). Then, the electronic pen 104 transmits, to the server device 16, data including the acquired model selection information 18 and the acquired equipment ID, in the state in which the data is associated with identification information of the electronic pen 104 (i.e., pen ID). In this manner, the model selection information 18 is supplied to the server device 16.

Moreover, in step S6, the server device 16 transmits data including the model parameters 20 selected in step S5 and the equipment ID to the electronic pen 104 having the pen ID associated with the relevant model selection information 18. Then, the electronic pen 104 transmits a downlink signal including the acquired model parameters 20 and the acquired equipment ID to the electronic equipment 102. In this manner, the model parameters 20 are supplied to the electronic equipment 102.

When the electronic equipment 102 and the server device 16 are capable of bidirectionally communicating via the relay by the electronic pen 104 as described above, the parameter setting section 52 of the electronic equipment 102 may acquire the model parameters 20 corresponding to the model selection information 18 from the electronic pen 104 and set the model parameters 20. As a result, even when communication cannot be directly carried out between the electronic equipment 102 and the server device 16, selection and setting of the model parameters 20 suitable for the use condition of the electronic pen 104 or the electronic equipment 102 can be carried out.

Second Modification Example

Figure 17:
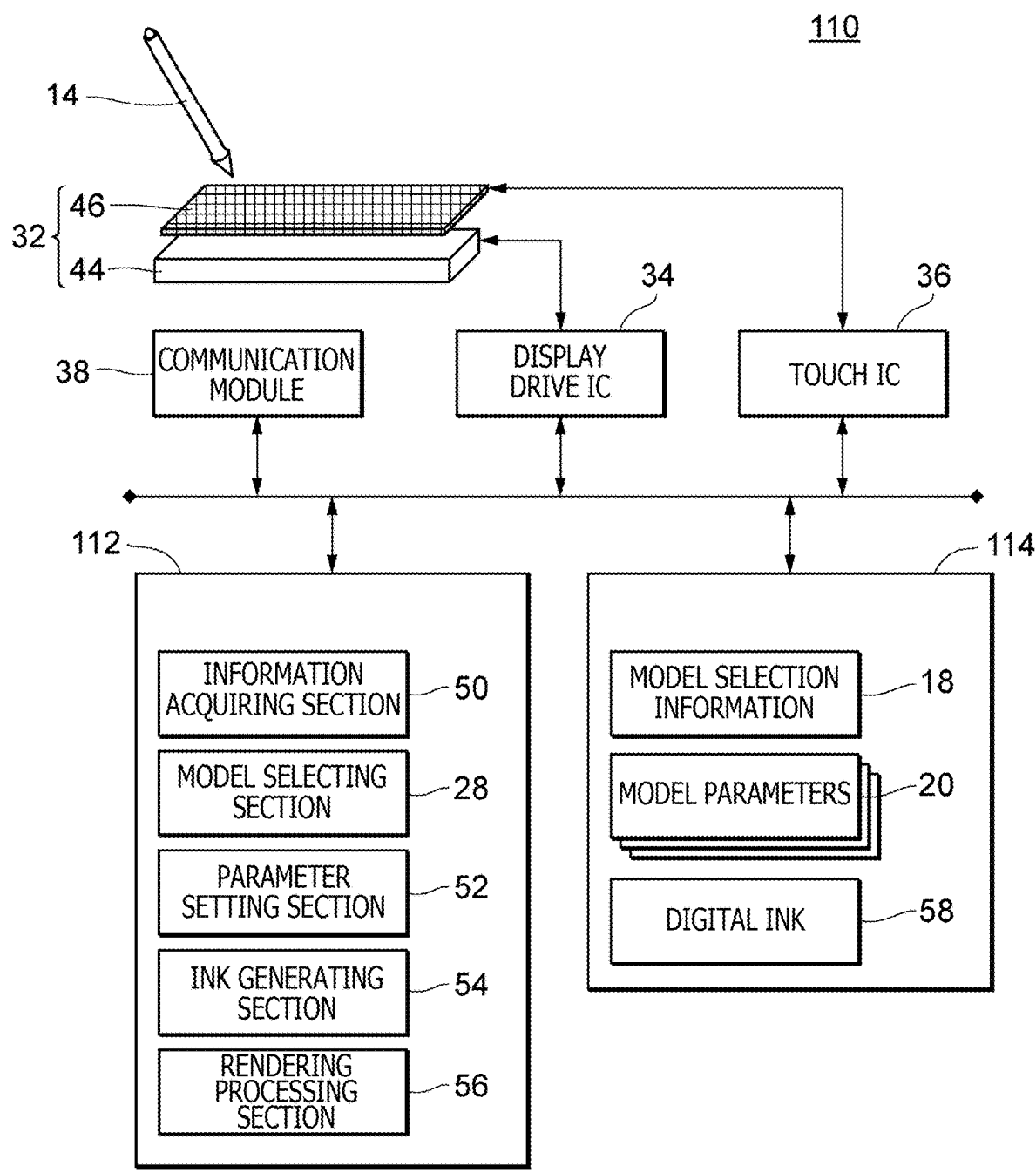
FIG. 17 is a block diagram illustrating one example of the configuration of electronic equipment in a second modification example.

FIG. 17 is a block diagram illustrating one example of the configuration of electronic equipment 110 in a second modification example. Specifically, the electronic equipment 110 includes the touch panel display 32, the display drive IC 34, the touch IC 36, the communication module 38, a host processor 112, and a memory 114.

The host processor 112 is different from the configuration illustrated in FIG. 2 in that the host processor 112 further includes the model selecting section 28. Moreover, the memory 114 is different from the configuration illustrated in FIG. 2 in that the memory 114 stores multiple sets of the model parameters 20. By incorporating part of functions of the server device 16 (FIG. 1) into the electronic equipment 110 as described above, similar operation can be carried out along the sequence illustrated in FIG. 3 without the server device 16 being provided.

Specifically, steps S3, S4, S5, S6, and S7 relating to transmission and reception of data in the sequence of FIG. 3 can be omitted. In this case, in step S5, it suffices that the host processor 112 of the electronic equipment 110 (more specifically, the model selecting section 28) uses the model selection information 18 acquired in step S2, as a search key, and selects, from among the multiple sets of the model parameters 20 stored in the memory 114, the model parameters 20 that allow identification of the input-output model 70 corresponding to the model selection information 18.

When the memory 114 of the electronic equipment 110 can store multiple sets of the model parameters 20 as described above, the parameter setting section 52 may select, from among the multiple sets of the model parameters 20 stored in the memory 114, the model parameters 20 corresponding to the model selection information 18, and set the model parameters 20. As a result, selection and setting of the model parameters 20 suitable for the use condition of the electronic pen 14 or the electronic equipment 110 can be carried out without the server device 16 being provided.

OTHER MODIFICATION EXAMPLES

In the above-described embodiment, setting of the input-output model 70 is triggered by detection of the electronic pen 14. However, the timing of the setting is not limited thereto. For example, the touch IC 36 may be configured to be capable of dynamically setting the input-output model 70 in such a manner that detection of a change in terms of the outer shape of the electronic pen 14 or the electronic equipment 12 is used as a trigger for the setting. Alternatively, the touch IC 36 may also be configured to be capable of dynamically setting the input-output model 70 in such a manner that detection of a change in the combination of two or more of a type of the electronic pen 14, a type of the electronic equipment 12, a type of the touch sensor 46, and the user, is used as a trigger for the dynamic setting.

In the above-described embodiments, the input-output model 70 is constructed by using the neural network illustrated in FIG. 7. However, the method of the machine learning is not limited thereto. For example, various methods including a logistic regression model, a support vector machine (SVM), a decision tree, a random forest, and a boosting method may be employed. Alternatively, the data definition of the model parameters 20 may be, in addition to the learning parameters, various coefficients to identify a function, a state quantity or a table indicating a correction amount of the state quantity, or the like.

The invention claimed is:

1. A method executed by an electronic equipment configured to detect a pen, the electronic equipment including a touch sensor of a capacitive system made of planarly disposed multiple sensor electrodes, the method comprising:
    detecting a pen signal transmitted from the pen at the planarly disposed multiple sensor electrodes of the touch sensor;
    deriving a coordinate value of the pen using an input-output model in which values according to a signal level of the pen signal detected at the planarly disposed multiple sensor electrodes are input and data related to the coordinate value of the pen is output;
    acquiring a degree of curving or bending of the touch sensor; and
    updating the input-output model in response to a change in the degree of curving or bending of the touch sensor, and using a second input-output model different from a first input-output model in response to a change from a first degree of curving or bending associated with the first input-output model to a second degree of curving or bending associated with the second input-output model.

2. The method according to claim 1, wherein the degree of curving or bending of the touch sensor is a detection value of a strain sensor disposed in the touch sensor.

3. The method according to claim 1, wherein the degree of curving or bending of the touch sensor is a measurement value input through user operation of the electronic equipment.

4. The method according to claim 1, wherein the degree of curving or bending of the touch sensor indicates absence or presence of curvature or bend of the touch sensor.

5. The method according to claim 1, wherein the degree of curving or bending of the touch sensor indicates a high degree of curvature or bend of the touch sensor or a low degree of curvature or bend of the touch sensor.

6. The method according to claim 1, wherein the degree of curving or bending of the touch sensor indicates a degree of curvature or a bending angle.

7. The method according to claim 1, wherein the input-output model is updated based on a set of model parameters, which is selected from multiple sets of model parameters suitable for a case in which the touch sensor is flat or a case in which the touch sensor is curved or bent.

8. An electronic equipment, comprising:
    a touch sensor of a capacitive system made of planarly disposed multiple sensor electrodes; and
    a processor coupled to the touch sensor and configured to:
        detect a pen signal transmitted from a pen at the planarly disposed multiple sensor electrodes of the touch sensor;
        derive a coordinate value of the pen using an input-output model in which values according to a signal level of the pen signal detected at the planarly disposed multiple sensor electrodes are input and data related to the coordinate value of the pen is output, wherein the values represent positions on the touch sensor;
        acquire a degree of curving or bending of the touch sensor; and
        update the input-output model in response to a change in the degree of curving or bending of the touch sensor, and use a second input-output model different from a first input-output model in response to a change from a first degree of curving or bending associated with the first input-output model to a second degree of curving or bending associated with the second input-output model.

9. The electronic equipment according to claim 8, wherein the degree of curving or bending of the touch sensor is a detection value of a strain sensor disposed in the touch sensor.

10. The electronic equipment according to claim 8, wherein the degree of curving or bending of the touch sensor is a measurement value input through user operation of the electronic equipment.

11. The electronic equipment according to claim 8, wherein the degree of curving or bending of the touch sensor indicates absence or presence of curvature or bend of the touch sensor.

12. The electronic equipment according to claim 8, wherein the degree of curving or bending of the touch sensor indicates a high degree of curvature or bend of the touch sensor or a low degree of curvature or bend of the touch sensor.

13. The electronic equipment according to claim 8, wherein the degree of curving or bending of the touch sensor indicates a degree of curvature or a bending angle.

14. The electronic equipment according to claim 8, wherein the processor updates the input-output model based on a set of model parameters, which is selected from multiple sets of model parameters suitable for a case in which the touch sensor is flat or a case in which the touch sensor is curved or bent.

15. An integrated circuit incorporated in an electronic equipment, the electronic equipment including a touch sensor of a capacitive system made of planarly disposed multiple sensor electrodes, the integrated circuit configured to perform:
    detecting a pen signal transmitted from a pen at the planarly disposed multiple sensor electrodes of the touch sensor;
    deriving a coordinate value of the pen using an input-output model in which values according to a signal level of the pen signal detected at the planarly disposed multiple sensor electrodes are input and data related to the coordinate value of the pen is output, wherein the values represent positions on the touch sensor;
    acquiring a degree of curving or bending of the touch sensor; and
    updating the input-output model in response to a change in the degree of curving or bending of the touch sensor, and using a second input-output model different from a first input-output model in response to a change from a first degree of curving or bending associated with the first input-output model to a second degree of curving or bending associated with the second input-output model.

16. The integrated circuit according to claim 15, wherein the degree of curving or bending of the touch sensor is a detection value of a strain sensor disposed in the touch sensor.

17. The integrated circuit according to claim 15, wherein the degree of curving or bending of the touch sensor is a measurement value input through user operation of the electronic equipment.

18. The integrated circuit according to claim 15, wherein the degree of curving or bending of the touch sensor indicates absence or presence of curvature or bend of the touch sensor.

19. The integrated circuit according to claim 15, wherein the degree of curving or bending of the touch sensor indicates a high degree of curvature or bend of the touch sensor or a low degree of curvature or bend of the touch sensor.

20. The integrated circuit according to claim 15, wherein the degree of curving or bending of the touch sensor indicates a degree of curvature or a bending angle.

* * * * *